Figure 1:
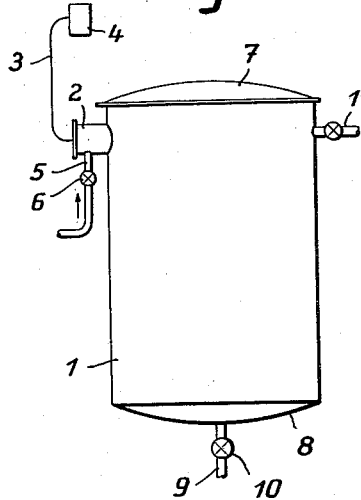

July 9, 1963

H. BECKMANN 3,097,099

METHOD FOR CONSERVING FISH

Filed Jan. 28, 1959

INVENTOR:
Hans Beckmann
BY:
Beaman Beaman 3,097,099
METHOD FOR CONSERVING FISH
Hans Beckmann, Rutschbahn 7, Hamburg, Germany
Filed Jan. 28, 1959, Ser. No. 789,472
9 Claims. (Cl. 99—195)

The invention applies to a method for conserving fish.

In order to conserve fish it has been proposed already in the applicant's patent application Ser. No. 652,139, now Patent No. 2,987,404, of which the instant application is a continuation-in-part, to de-gasify and to deaerate fish by subjecting them to a high vacuum, the selected degree of vacuum being such that the fish cools down to approximately freezing temperature by vaporizing the moisture on its surface, but it is not frozen. After this, the fish is kept in the de-gasified and deaerated condition. In this way, the bacterial as well as the autolytic decomposition is widely avoided. This process may likewise be carried out in such a way that additional water is fed to the fish before or during the vacuum treatment.

By practical experience in using this process it has been found that especially fish that have not been butchered are suffering damages in their cell structure by decreasing the ambient pressure to about 4 mm. Hg, because gases forming in the fish body during storage do not disappear quickly enough. Thus a swelling of the fish, especially in the region of the belly occurs, because the extremely aggressive digestion enzymes in the digestive tract effect a strong gas formation. At the very high vacuum, this overpressure may therefore lead to damages in the structure of the fish.

These phenomena may absolutely be avoided if the fish during their storage are exposed to a higher pressure, say from 80 mm. Hg on upwards. The swelling then disappears without hindering the diffusion of the gases. The pressure to be applied during storage depends on the sort of fish. Thus this increase of pressure is effected only after the fish has been de-gasified and de-aerated by applying the high vacuum and has been cooled down to freezing temperature by vaporizing the moisture present on its surface, but has not been frozen.

This pressure may be generated by means of vapors, gases or liquids. It is of course understood that the pressure increasing means must be fully neutral and do not effect any chemical reactions, deposits or other transformations and contain neither air nor oxygen.

So, any desired pressure increase may be achieved by introducing vapors of cooling means, for instance frigene 12, i.e. difluordichlormethane $CF_2Cl_2$, or gases, for instance nitrogen $N_2$, or a liquid, for instance de-gasified and sterilized water, without influencing the de-gasifying process (Dalton's law).

By introduction of frigene 12, for instance herrings, which are very delicate may be preserved in an unobjectionable condition for about 3 weeks at a pressure of 100 mm. Hg.

Also, when storing fish at an increased pressure in accordance with the invention, the aerobic seawater bacteria which are mainly responsible for the decay are killed and the anaerobic bacteria are prevented from forming spores.

If, as already explained, a cooling means, for instance frigene 12 is used to increase the pressure another advantage is obtained in so far as the vapor of the cooling means may be utilized for carrying-off the heat entering during the storage. For this purpose, the vapor of the cooling means is sucked from the tank by means of a compressor, condensed, and liquefied in a condenser and then sprayed again into the tank or storage room. As a result of the decrease of pressure during the spraying process the cooling means will vaporize, so that by this process of vapor compression the entering heat is carried-off to the outside.

This process may likewise be applied in case of direct deep-freezing of fish. All that is necessary is to adjust in the tank or in the storage room, respectively, a vaporizer pressure in accordance with the cooling means. Then, on completion of the deep-freezing, the vapors of the cooling means are sucked-off by the compressor until a pressure of 1 mm. Hg has been reached, which corresponds to a temperature of −20° C., and are then condensed and forced into the liquid collector. In this way it is possible to carry out the degasifying, deaerating, deep-freezing and storing in one and the same room (tank) and in one working operation.

This process may also be carried out using a gas, for instance $N_2$, a liquefying of the gas of course not being necessary. In this case it is sufficient that the gas which was sucked-off, compressed and cooled expands into the tank. This process is extremely simple and also sufficiently economical if a heat exchanger is used.

By this it is possible to carry-off the solidification heat which is of most account in the deep-freezing process, in the economically most favourable phase.

What is of decisive importance in the deep-freezing process is the fact that the temperature drop from 0° C. to −4° C. must be completed within a period of 2 to 4 hours, in order to avoid the formation of larger ice crystals which would cause damage to the cell structure. Then, the further cooling down to about −20° C. is of no importance, as far as time is concerned.

In order to attain these successive steps the known processes must work with uneconomically low temperature of about −40° C. Hereby, not only considerable amount of thermal units are lost during the cooling process, but the goods to be cooled must also be cooled deeper than would as a matter of fact be necessary for the storage, because the goods are reabsorbing a considerable amount of thermal units before being stored in the deep-freezing house. Apart from these losses of invaluable energy, these deeper temperatures entail a partial denaturation of the albumin and a detrimental recrystallization.

These drawbacks may be avoided in that according to the invention all steps are carried out in one working operation and in one and the same tank or room.

In practice, it may be preceded in such a way that, for instance, herrings or fish fillets are placed into the tank, deaerated, de-gasified, and then a very rapid cooling is reached down to about −4° C. by increasing the vacuum to about 3.4 mm. Hg by means of a vapor jet pump. Thereupon the tank is closed with respect to the vacuum pump and now a vapor of the cooling means or an expanding gas is introduced, so that the following cooling down to −20° C. may be achieved very rapidly.

The vapors of the cooling means or the gas, respectively, are then sucked-off until the vacuum corresponding to a temperature of −20° C. is reached, i.e. 1 mm. Hg.

The tanks may then be stored in a deep-freezing room. If the tanks are to be stored outside of the deep-freezing room, the entering heat must be carried-off, for instance, by a radiator coil arranged in the double wall of the tank or by a cooled brine and the like running down the walls of the inside tank. The carrying-off of the entered heat may also be effected by direct repeated spraying of cooling means or by expanding gas respectively.

According to this, the high energy output at solidification takes place in the region of the jet pump, which is favourable from an economical as well as from a technical point of view, whilst the dissipation of the remarking heat takes place in the vapor compression or gas expansion process.

In compliance with local conditions, however, the solidification phase may as well be transferred into the region of the vapor compression or gas expansion process.

If only the entering heat is to be carried-off, it will be sufficient in many cases to force the vapors gases or liquids which have been introduced during the storage in order to increase the pressure by means of a ventilator or a pump along cooling surfaces which are exposed inside or outside the tank, so as to carry off the entered heat to the outside.

If the carrying-off of the entered heat is to be effected directly, for instance by means of the gas expansion process, the process will advantageously be carried out under continually in a certain rhythm fluctuating pressures in order to obtain a more uniform effect.

This may be illustrated by way of the following example:

If herrings which have been de-gasified, deaerated and cooled to about 1° C. in accordance with the invention are to be stored at a pressure of about 300 mm. Hg, for instance $N_2$ is introduced until this pressure has been reached. Then the supply is shut-off and the gas in the tank is sucked-off, compressed to a pressure of about 3 kg./cm.$^2$, cooled in a heat exchanger and expanded back into the tank by means of a nozzle, whereby it cools down to about −60° C. As this gas when flowing through the tank takes the most convenient way, the flow within the tank or its content, respectively, is not even so that zones of different temperatures may be formed. In order to avoid this, the expansion of the gas is carried out intermittently in such a way that pressure fluctuations between 3 and 300 mm. Hg occur in the tank. In this way the gas which has been cooled by means of the expansion may get into the finest interstices and effect a uniform distribution of temperature.

When applying vapors of cooling means and using the vapor compression process, it may be preceded in the same way.

Figure 2:
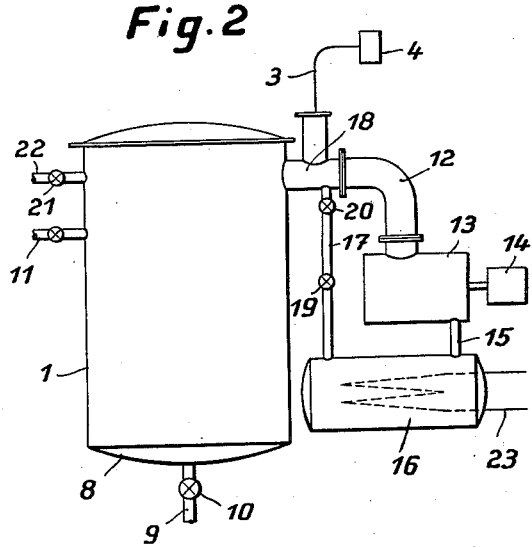

The above methods may be practiced by the use of such apparatus as is shown in the drawings wherein:

FIG. 1 shows a container with the pertaining connections for carrying out the process provided in accordance with the invention, FIG. 2 shows a container with the pertaining connections and devices for carrying out the process of the invention in a modified form.

In accordance with FIG. 1, a vacuum container 1 is provided which is connected to a vacuum source 4, for example, a vapor jet pump, through a connection 2 and a conduit 3. A conduit 5 terminates in the connection 2 and thus in the container 1, said conduit being adapted to be shut off by a shutoff valve 6. The lid 7 of the container is removable. A conduit 9 branches off from the bottom 8 of the container with a shutoff valve 10 being provided within the said conduit. Water may be introduced through a conduit 11 which likewise terminates in the container, the water being distributed on the contents of the container, in particular the killed fish, in the form of sprays. The water may be drained off via the conduit 9.

The container is charged with the killed fish which may or may not be butchered. The advantages of the process are especially present with fish that are not butchered. Now, a vacuum of about 4 mm. Hg is created in the container while constantly wetting the surface of the fish, by which the temperature of the fish drops to about freezing temperature. In accordance with the U.S. Patent No. 2,987,404 of the inventor, this prevents the aerobic and anaerobic bacteria from becoming active so that the fish is preserved to a considerable extent.

After the fish is cooled in this manner to about freezing temperature and degasified and deaerated, the operation of the vacuum apparatus 4 is interrupted and a flow agent containing no oxygen, for instance frigene or nitrogene, is admitted into the container 1 until the pressure inside increases to, for instance 100 mm. Hg. By this action, swellings of the fish bodies are made to disappear, which may occur in particular when fish that are not butchered are placed under a vacuum.

The container shown in FIG. 2, in all the essential details, corresponds with that of FIG. 1, so that similar parts are designated with the same reference numerals. Instead of the conduit 5 and the shutoff valve 6, a conduit 12 is provided which connects the container 1 with the suction pipe of a compressor 13, said compressor 13 being driven by a motor 14. The pressure side of the compressor is connected with a container 16 over a conduit 15, the container 16 communicating with the pipe 18 and, thus, with the container 1 by a conduit 17. In the conduit 17, a shutoff valve 19 is provided and, in addition, a cutoff valve 20 is arranged at the end of the conduit 17.

The vacuum treatment of the fish is carried out in accordance with the U.S. Patent No. 2,987,404. Thus, at the end of this process, the fish again has a temperature of about freezing at an inner pressure of the container 1 of about 4 mm. Hg.

Now, for instance, nitrogen gas ($N_2$) is introduced into the container 1 over a conduit 22 provided with a shutoff valve 21 up to a pressure lying above said vacuum, for example, such as 300 mm. Hg. Thereupon, the compressor 13 is started which now sucks the nitrogen gas from the container and forces it into the collector 16 until the pressure in the container has substantially diminished, such as to about 3 mm. Hg, for example. The collector 16 is designed in the manner of a heat exchanger, and is equipped with a cooling coil 23 through which cooling water is conducted. By this, the compressed nitrogen gas which has been correspondingly heated, emanating from the compressor 13 is cooled. Thereupon, with the compressor 13 at a standstill and with the shutoff valve 19 being opened, the cooled and pressurized nitrogen gas is admitted into the container 1 over the cutoff valve 20. Owing to the expansion, the gases are considerably cooled, and are now in a position to carry off the heat radiation from outside which would lead to a slight increase in the temperature of the fish. Here it must be taken into consideration that however strong the cooling of the gas owing to the expansion may be, there will occur no freezing of the fish, but only the heat radiated from outside is carried off, because the heat content of the $N_2$-gases is very low.

After the $N_2$ is introduced into the container 1 and the pressure therein reaches its maximum, the compressor 13 is again started and the cycle repeated. Thus, the operation with the container, according to FIG. 2, is an intermittent one. In this manner, one obtains the advantage that owing to the constant pressure changes, the cooled gases pervade all the cavities between the fish.

What I claim is:

1. In a method for the conservation of fresh fish, the steps of storing said fish in a sealable container, subjecting said container to a vacuum in order to degasify and deaerate said fish and to cool said fish to a degree such that the body cell contents and the intercellular liquid are cooled to approximately their freezing temperature, but do not freeze, subjecting said container to a pressure higher than said vacuum by means of a fluid chemically neutral with respect to said fish, and maintaining said pressure as long as conservation is desired.

2. In a method for the conservation of fresh fish, the steps of moistening the surface of said fish with water liquid, storing said fish in a sealable container, subjecting said container to a vacuum in order to degasify and to deaerate said fish and to cool said fish to a degree such that the body cell contents and the intercellular liquid are cooled to approximately their freezing temperature, but do not freeze by evaporating the liquid existent thereupon, increasing the pressure within the interior of said container by means of a fluid chemically neutral with respect to said fish, and maintaining said increased pressure as long as conservation is desired.

3. In a method for the conservation of fresh fish, the steps of storing said fish in a sealable container, subjecting said container to a vacuum of about four millimeter mercury column in order to degasify and to deaerate said fish and to cool said fish to a degree such that the body contents and he intercellular liquid are cooled to approximately their freezing temperature, but do not freeze, introducing into said container a fluid chemically neutral with respect to said fish for increasing the pressure in said container above said vacuum, and maintaining said increased pressure as long as conservation is desired.

4. In a method for the conservation of fresh fish, the steps of storing said fish in a sealable container, subjecting said container to a vacuum in order to degasify and to deaerate said fish and to cool said fish to about freezing temperature without freezing said fish, subjecting said fish to a pressure higher than said vacuum by introducing into said container degasified and sterilized water, and maintaining said pressure as long as conservation is desired.

5. In a method for the conservation of fresh fish, the steps of storing said fish in a sealable container, subjecting said container to a vacuum in order to degasify and to deaerate said fish and to cool said fish to about freezing temperature without freezing said fish, subjecting said fish to a pressure higher than said vacuum by introducing into said container nitrogen, and maintaining said pressure as long as conservation is desired.

6. In a method for the conservation of fresh fish, the steps of storing said fish in a sealable container, subjecting said container to a vacuum in order to degasify and to deaerate said fish and to cool said fish to about freezing temperature without freezing said fish, subjecting said fish to a pressure higher than said vacuum by introducing into said container difluoridichlormethane, and maintaining said pressure as long as conservation is desired.

7. In a method for the conservation of fresh fish, the steps of storing said fish in a sealable container, subjecting said container to a vacuum of about four millimeter mercury column in order to degasify and to deaerate said fish and to cool said fish to about freezing temperature without freezing said fish, subjecting said fish to a pressure of at least eighty millimeter mercury column, and maintaining said pressure as long as conservation is desired.

8. In a method for the conservation of fresh fish, the steps of storing said fish in a sealable container, subjecting said container to a vacuum of about four millimeter mercury column in order to degasify and to deaerate said fish and to cool said fish to about freezing temperature without freezing said fish, subjecting said fish to a pressure lying above said vacuum by introducing into said container difluordichlormethane vapors, drawing said vapors from said container and compressing said vapors, liquefying said vapors, spraying said liquefied difluordichlormethane into said container for vaporizing said difluordichlormethane, and cyclic repeating said drawing, compressing, liquefying and spraying cycle.

9. In a method for the conservation of fresh fish, the steps of storing said fish in a sealable container, subjecting said container to a vacuum of about four millimeter mercury column in order to degasify and to deaerate said fish and to cool said fish to about freezing temperature without freezing said fish, subjecting said fish to a pressure lying above said vacuum by introducing nitrogen gas into said container, drawing said gas from said container and compressing said gas, cooling said compressed gas, introducing said compressed and cooled gas into said container for expanding said gas, and cyclic repeating said drawing, compressing, cooling and introducing cycle.

References Cited in the file of this patent

UNITED STATES PATENTS

| | | |
|---|---|---|
| 1,888,133 | Kronquest | Nov. 15, 1932 |
| 1,938,522 | Grayson | Dec. 5, 1933 |
| 2,344,151 | Kasser | Mar. 14, 1944 |
| 2,684,907 | Brunsing | July 27, 1954 |
| 2,832,690 | Brunsing et al. | Apr. 29, 1958 |